Figure 1:
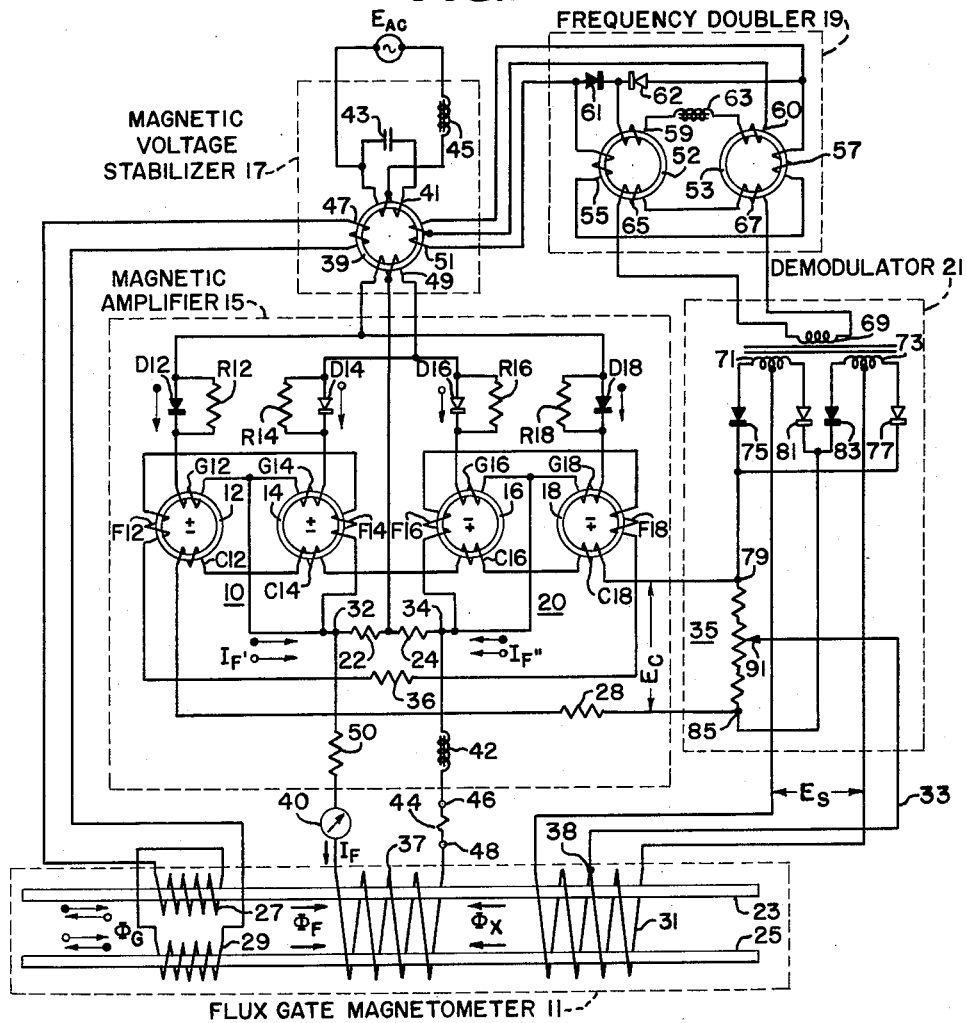

June 19, 1962 W. A. GEYGER 3,040,248
SELF-BALANCING FLUX-GATE MAGNETOMETER
Filed Oct. 30, 1958 2 Sheets-Sheet 1

INVENTOR
W. A. GEYGER

BY
ATTORNEYS

June 19, 1962 W. A. GEYGER 3,040,248
SELF-BALANCING FLUX-GATE MAGNETOMETER
Filed Oct. 30, 1958 2 Sheets-Sheet 2

INVENTOR.
W. A. GEYGER

… … …

United States Patent Office 3,040,248
Patented June 19, 1962

3,040,248
SELF-BALANCING FLUX-GATE MAGNETOMETER
William A. Geyger, 8510 Flower Ave., Apt. 2B,
Takoma Park 12, Md.
Filed Oct. 30, 1958, Ser. No. 770,896
5 Claims. (Cl. 324—43)
(Granted under Title 35, U.S. Code (1952), sec. 266)

The invention described herein may be manufactured and used by or for the Government of the United States of America for governmental purposes without the payment of any royalties thereon or therefor.

This invention relates to means for measuring weak magnetic fields such as the earth's magnetic field and particularly to a flux-gate type magnetometer employing a self-balancing magnetic amplifier.

This invention is concerned with the application of a self balancing magnetic amplifier to flux gate magnetometers. A second harmonic type flux gate magnetometer is operated in conjunction with a push-pull magnetic amplifier in such a way that the D.C. flux in the high permeability cores of the magnetometer is completely balanced by an opposing D.C. flux. The magnetic field to be investigated e.g. the earth's magnetic field in the vicinity of the magnetometer remains substantially undisturbed. The opposing or compensating D.C. flux is produced by and is linearly proportional to the average value of the polarity reversible unidirectional output current of the magnetic amplifier. With the use of regenerative feedback windings, this current is varied by an infinitesimal D.C. flux change in the cores of the magnetometer and may be ndicated or recorded by high precision moving coil instruments or D.C. potentiometer recorders. In a modified arrangement, a flux gate type is employed having magnetometer core windings, the self-balancing flux-gate magnetometer being used as a gradiometer for the measurement of inhomogeneity of magnetic fields.

It is an object of this invention to provide a new and improved instrument for measuring weak magnetic fields.

It is another object of this invention to provide a novel instrument for measuring the difference between the strength of two magnetic fields.

Another object of this invention is to provide a device for measuring magnetic fields comprising all magnetic components.

Another object of this invention is to provide a self-balancing magnetic amplifier in combination with a flux gate magnetometer for measuring weak magnetic fields such as the earth's magnetic field.

Another object of this invention is to provide a flux gate magnetometer for detecting inhomogeneity in weak magnetic fields.

A further object of this invention is to provide a device for measuring weak magnetic fields in which the field to be measured will be substantially undisturbed.

It is a still further object to provide a magnetometer for measuring weak magnetic fields in which the flux of the field to be measured is completely balanced by an equal in strength and opposite D.C. flux.

It is a still further object to provide a magnetometer combined with a self-balancing magnetic amplifier for measuring weak magnetic fields in which the magnetic amplifier supplies an output current linearly proportional to the flux of the magnetic field to be measured.

Figure 2:
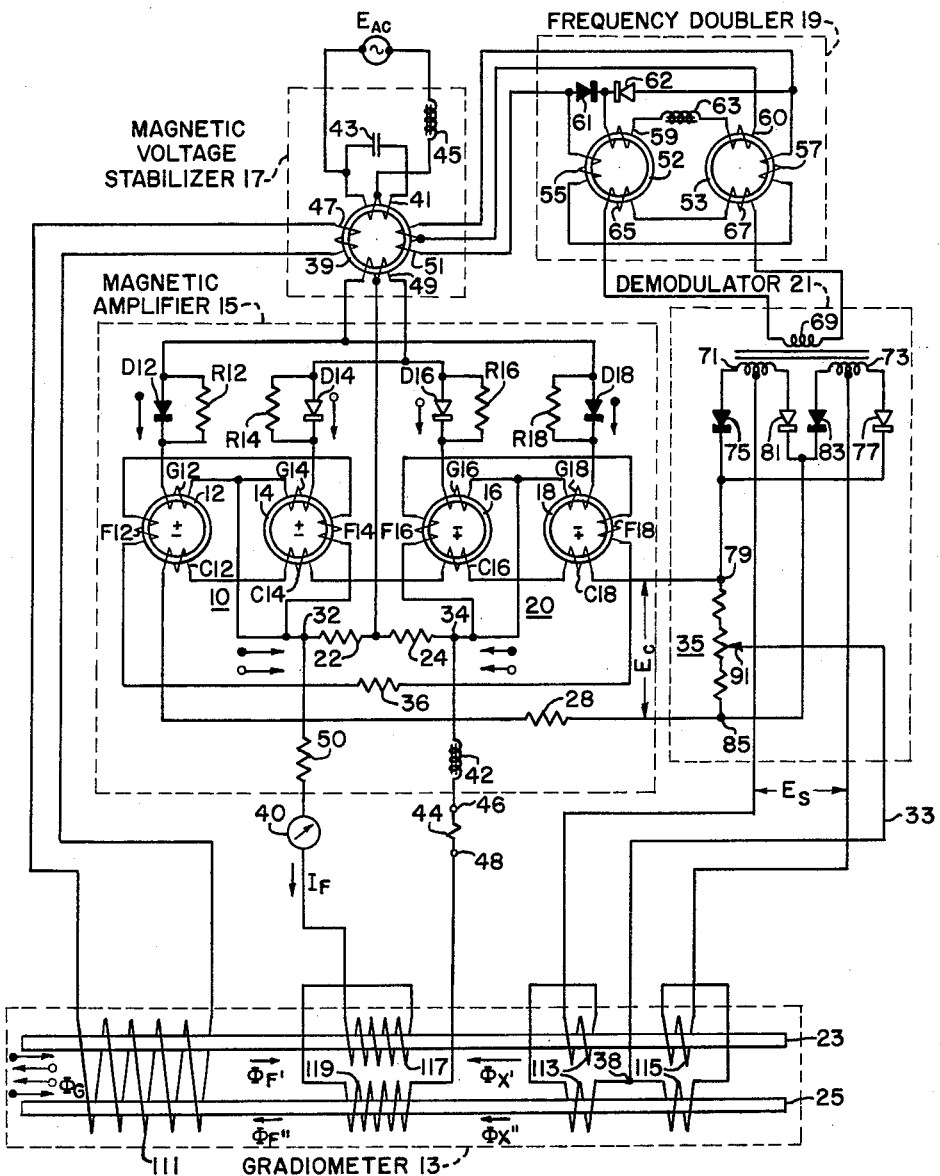

Still further objects and the entire scope of applicability of the present invention will become apparent from the detailed description given hereinafter; it should be understood however that the detailed description and specific examples, while exemplifying preferred embodiments of the invention, are given by way of illustration only, since various changes and modifications within the spirit and scope of the invention will become apparent to those skilled in the art from the following detailed description in conjunction with the accompanying drawings in which like reference characters designate like parts throughout the several figures thereof and wherein:

FIG. 1 is a circuit diagram of a magnetometer employing a self-balancing magnetic amplifier for measuring weak magnetic fields; and FIG. 2 is a circuit diagram of a gradiometer or magnetometer employing a self-balancing magnetic amplifier for measuring the inhomogeneity in a magnetic field.

Referring now to FIG. 1 of the drawings, a voltage $E_{ac}$ is a source of alternating current for a magnetic voltage stabilizer 17. Magnetic voltage stabilizer 17 applies an A.C. voltage to flux gate magnetometer 11, magnetic amplifier 15 and frequency doubler 19. Frequency doubler 19 supplies an A.C. voltage with twice the frequency of $E_{ac}$ to demodulator or phase sensitive rectifier 21.

Flux gate magnetometer 11 comprises two open-ended linear cores 23 and 25 disposed physically in parallel relationship. The primary circuit of magnetometer 11 comprises two equal windings 27 and 29 serially connected. Winding 27 disposed on core 23 is wound opposite in sense to winding 29 disposed on core 25. With this arrangement, for a given half cycle of an A.C. voltage applied to the primary circuit, the flux produced in core 23 due to current flow in winding 27 will be equal and opposite in direction to the flux produced in core 25 due to current flow in winding 29. The secondary circuit of magnetometer 11 comprises a winding 31 which is wound around both cores 23 and 25. This winding is equivalent to a winding on each core, serially connected and wound in the same sense. A conductor 33 interconnects a center tap of winding 31 to an adjustable tap on resistance unit 35. A third or compensating circuit comprises in part a single winding 37 wound around both cores 23 and 25. A voltage applied to the compensating winding 37 will cause a flux $\phi_F$ in each of the cores which are equal in magnitude and the same in polarity.

The magnetic voltage stabilizer 17 which may be used to provide a more stable voltage supply comprises a non-linear reactor core 39, a primary circuit and a secondary circuit. The primary circuit connects to $E_{ac}$ and contains primary winding 41, capacitor 43 and linear reactor 45. Three separate secondary windings 47, 49 and 51 are provided to supply a square wave A.C. voltage of frequency $f_p$ to the magnetometer, the magnetic amplifier and the frequency doubler respectively.

Frequency doubler 19 has two equally rated saturable elements 52 and 53 constructed preferably of tape cores possessing the magnetic characteristics of the material known in the art as Orthonal. Series opposing-connected A.C. windings 55 and 57 connect to the secondary winding 51 of the magnetic voltage stabilizer. Series aiding-connected D.C. windings 59 and 60 connect between the center tap and each end of winding 51. Rectifiers 61 and 62 provide for full-wave rectified unidirectional current in the D.C. windings. A choke coil 63 connects between the D.C. windings to prevent a second harmonic current from flowing therethrough. The second harmonic reference voltage output is provided by series-aiding-connected secondary windings 65 and 67. Secondary windings 65 and 67 connect to the input circuit of the demodulator 21.

The demodulator 21 or full-wave phase sensitive rectifier includes a reference-voltage transformer with primary winding 69 and center tapped secondary windings 71 and 73 in addition to a phase reversible A.C. voltage source $E_s$ which is derived from winding 31 of the magnetometer. Magnetometer winding 31 connects to the center taps of secondary windings 71 and 73 of the reference voltage transformer. The outer terminals of windings 71 and 73 connect respectively through diodes 75 and 77 to a common terminal 79. The inner terminals of windings 71 and 73 connect respectively through diodes 81 and 83 to a common terminal 85. A resistance unit 35 connects between common terminals 79 and 85. The particular resistance unit 35 illustrated is preferably made up of three serially connected resistors. The center tap 38 of winding 31 connects to the center of resistance unit 35 through an adjustable tap 91. Tap 91 is a zero adjustment for variations in circuit parameters e.g. if the resistance values of the diodes varied slightly or if the secondary windings were not exactly equal in value, such slight differences could be compensated for by adjusting tap 91. The circuit thus described constitutes a conventional phase sensitive rectifier with the reference voltage furnished by the secondary windings 65 and 67 and the signal voltage $E_s$ furnished by winding 31 of the magnetometer. The phase sensitive rectifier thus described provides a polarity reversible D.C. voltage $E_c$ across terminals 79 and 85 dependent in magnitude and polarity upon the magnitude and phase of signal voltage $E_s$. Further information relating to the phase sensitive rectifier circuit may be found in U.S. Patent No. 2,819,439 to W. A. Geyger.

The magnetic amplifier 15 has two saturable-reactor systems 10 and 20, one a "plus-minus" [±] system with saturable cores 12 and 14 and the other, a "minus-plus" [∓] system with saturable cores 16 and 18. Gate windings G12, G14, G16 and G18 are connected to center tapped secondary winding 49 of the magnetic voltage stabilizer through silicon junction diodes D12, D14, D16 and D18 respectively. Quiescent current values are adjusted by the provision of diode-shunt resistors R12, R14, R16 and R18. Gate windings G12 and G14 are connected in series opposition as are gate windings G16 and G18. The common juncture between windings G12 and G14 is connected through resistors 22 and 24 to the common juncture between windings G16 and G18. A conductor connecting from the juncture between resistors 22 and 24 to the center tap of winding 49 provides a return path for the gate windings. Control windings C12, C14, C16 and C18 are serially connected to terminals 79 and 85 of the phase sensitive rectifier circuit. Control windings C12 and C14 are wound in opposite sense to control windings C16 and C18. A resistor 28 may be connected in series with the control windings. Feedback windings F12, F14, F16 and F18 are serially connected to terminals 32 and 34. The feedback windings provide regeneration or positive feedback. They are wound in the same sense as the control winding for each respective core. A resistor 36 connects in series with the feedback windings. Resistor 36 is adjusted or properly sized to limit the current flow to obtain the proper amount of positive feedback or regeneration in accordance with the principal of the self-balancing magnetic amplifier as described in U.S. Patent 2,700,130, issued to W. A. Geyger. The compensating circuit including winding 37, meter 40, inductance 42 and resistance 50 connects to terminals 32 and 34 of the magnetic amplifier. Resistor 44 is symbolic of the resistance of a second self-balancing magnetic amplifier stage connected at terminals 46 and 48 if such additional stage is desired.

In the operation of the flux gate magnetometer, the flux set-up by the magnetic field to be measured will be completely balanced by an opposing flux created by current flow through compensating winding 37. The compensating circuit derives energy from the difference in potential between terminals 32 and 34. This potential difference is caused by a difference in current flow between the gate circuit of reactor system 10 and the gate circuit of reactor system 20.

For illustrating the operation of the circuitry, a system of black and white dots at the ends of arrows and black and white rectifiers have been employed. The black dot or rectifier pertains to the first half cycle of $E_{ac}$ and the white dot or rectifier pertains to the second half cycle of $E_{ac}$.

When the A.C. voltage from winding 47 of the magnetic voltage stabilizer energizes primary windings 27 and 29 of the magnetometer, a flux will be created in cores 23 and 25. The flux created in a first half cycle [black dot], sets up a flux in one direction in core 23 and in the opposite direction in core 25. For a second half cycle [white dot], the flux directions in each of the cores will be reversed. For a complete cycle of A.C. voltage, there will be no net flux created in cores 23 and 25 by winding 37. Further, since the primary windings 27 and 29 produce a flux in opposite directions in cores 23 and 25, respectively, and since the secondary winding 31 is wound around both cores, there will be no voltage induced in the secondary winding as a result of a voltage application to primary windings 27 and 29. When the flux of the field to be measured is zero e.g., $\phi_x=0$ there will be no voltage induced in secondary winding 31.

When the magnetometer is placed in a magnetic field, however, the flux $\phi_x$ causes a differential or net flux change in cores 23 and 25 and a voltage output will be induced in winding 31 which will have a frequency of $2f_p$. Voltage $E_s$ will have a phase dependent upon the direction of the flux $\phi_x$. $E_s$ is applied to the demodulator circuit which will operate to produce a D.C. output voltage $E_c$ across terminals of resistance unit 35. The polarity of $E_c$ is determined by the phase of $E_s$ and will be reversed when the phase of $E_s$ is reversed.

The polarity reversible voltage $E_c$ thus developed is applied to the control windings C12, C14, C16 and C18. Prior to the application of $E_c$ to the control circuit of the magnetic amplifier, the current flow through windings G12, G14, G16 and G18 are equal $[I_L'=I_L'']$ and hence the voltage drop across terminals 32 and 34 will be zero. There will be no current flow in the compensating winding 37 or in the feedback windings F12, F14, F16 and F18. Upon application of $E_c$ to the control windings, an unbalance in the current flow between saturable reactor systems 10 and 20 occurs and $I_L'$ is no longer equal to $I_L''$. It is assumed here by way of example that $I_L'$ will be greater than $I_L''$. The difference current $I_L$, $[I_L'-I_L'']$, is divided between the feedback circuit and the compensating circuit. The current flow through compensating winding 37 will be such that the flux produced as a result of this current flow will produce a flux $\phi_F$ which will be equal and opposite to the flux $\phi_x$ produced by the magnetic field to be measured. The meter 40 will indicate the current flow which is proportional to the flux $\phi_F$ and hence $\phi_x$.

Resistor 36 of the feedback circuit is adjusted so that $I_e$ is substantially zero at this point, and thus critical regeneration is effected.

FIG. 2 of the drawings illustrates a variation of the magnetometer or gradiometer 13. In this circuit the only changes made from the magnetometer of FIG. 1 are in the windings on the magnetometer cores. The remaining circuit elements are identical and hence bear the same numbers as in FIG. 1. The gradiometer circuitry comprises a primary circuit with winding 111 wrapped around both cores 23 and 25, a secondary circuit with windings 113 and 115. Winding 113 is divided into two equal portions, one portion wound around core 23 and the other portion wound around core 25. The portion of winding 113 on core 25 is wound opposite in sense to the portion of winding 113 on core 23. Likewise, a portion of winding 115 is wound on core 23 and an equal portion is wound on core 25. The portion on core 25 is connected opposite in sense to the portion on core 23. One terminal of each of the windings 113 and 115 is connected to a common center tap and the other terminals connect to the demodulator circuit.

A third circuit comprises windings 117 and 119 which are series connected; winding 117 is wound on core 23 and winding 119 is wound in opposite sense to winding 117 on core 25. Alternating current energy for the primary winding is obtained from winding 47 of the magnetic voltage stabilizer. The flux created in cores 23 and 25 by energizing winding 111 produces no output voltage across $E_s$ since the secondary winding portions 113 and 115 on core 23 are opposite in sense to the secondary winding portions 113 and 115 on core 25.

For illustration of the operation of the gradiometer, let it be assumed that flux $\phi_x'$ in core 23 is larger than the flux $\phi_x''$ in core 25 as represented by the different lengths of the arrows illustrated. Since windings 117 and 119 of the compensating circuit are wound in opposite sense with respect to each other, the compensating flux $\phi_F'$ in core 23 is opposite in direction to compensating flux $\phi_F''$ in core 25. Flux $\phi_F'$ will subtract from flux $\phi_x'$ and flux $\phi_F''$ will add to flux $\phi_x''$. The amount of compensating flux $\phi_F$ supplied by the compensating circuit will be such that the resultant flux in core 23 is equal to the resultant flux in core 25. In other words $$\phi_x' - \phi_F' = \phi_x'' + \phi_F''$$

The resultant flux $\phi_x' - \phi_F'$ of core 23 is opposite in polarity to resultant flux $\phi_x'' + \phi_F''$ and since the portions of windings 113 and 115 on core 25 are in opposite sense to the portions of windings 113 and 115 on core 25, the second harmonic voltage induced in the secondary circuit is zero. That is: $E_s = 0$.

The flux gate magnetometer has numerous other uses in addition to measurement of the earth's magnetic field e.g. detection of iron particles in aluminum or copper rods, and automatic compensation of the earth's field in test rooms. The flux gate magnetometer may also be used as a compass.

The core used in the magnetometer is in the form of a rod in which the length is large in proportion to the cross-sectional area. The cores may be solid or made from tape wound longitudinally around a base of insulating material. Materials having the magnetic properties of the material known in the art as Permalloy may be used.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A flux gate magnetometer for measuring the flux of weak magnetic fields comprising a pair of saturable cores linearly disposed and arranged in physically parallel relationship, a first circuit means including a winding on each of said cores, said windings interconnected in series-opposing relationship to an A.C. voltage source, a second circuit means comprising a winding wound around both cores and operable to produce an A.C. signal voltage when said cores are placed in a magnetic field to be measured, a phase sensitive rectifier having an input and an output and operable to convert an A.C. signal voltage to a polarity reversible D.C. voltage, means connecting said input to the winding of said second circuit, a self-balancing magnetic amplifier having an input and an output, said magnetic amplifier input connected to the output of said phase sensitive rectifier, a third circuit including a winding wound around both of said cores and a meter for measuring current flow, means serially interconnecting said third circuit winding and said meter to the output of said magnetic amplifier whereby the flux of a field set up in the magnetometer cores by the magnetic field to be measured will be balanced by a compensating flux of equal magnitude and opposite polarity created by a current flow in the winding of said third circuit caused by said magnetic amplifier and whereby said current flow will be linearly proportional to the flux of the magnetic field to be measured and will be indicated on said meter.

2. A gradiometer for measuring the inhomogeneity in a weak magnetic field comprising a first and second saturable core means linearly disposed and arranged in physically parallel relationship, a first circuit including a winding around both cores connected to a source of A.C. voltage, a second circuit including a winding on each of said cores connected in series opposing relationship, and operable to produce an A.C. signal voltage when a difference in flux exists between said cores, a phase sensitive rectifier having an input and an output and operable to convert an A.C. signal voltage to a polarity reversible D.C. voltage, a self-balancing magnetic amplifier having a control circuit and an output circuit and operable to produce a compensating D.C. voltage when a polarity reversible D.C. voltage is applied to said control circuit, means connecting the input of said phase sensitive rectifier to the winding of said second circuit, means connecting the output of said phase sensitive rectifier to the control circuit of said magnetic amplifier, a third circuit including a winding on each of said cores, a meter for measuring current flow, means serially interconnecting said windings in series-opposed relationship to said meter and to the output circuit of said magnetic amplifier whereby current flow in said third circuit will produce a flux of one polarity in one of said cores and a flux of equal magnitude but opposite polarity in the second of said cores and said current is indicated by said meter such that when said cores are placed in an inhomogeneous magnetic field, the difference flux in said cores will cause an output current in said third circuit which will produce a compensating flux of equal magnitude and opposite polarities in the respective cores which when subtracted from the flux of the core having a stronger magnetic field will be equal to the sum of said compensating flux and the flux of the core having a weaker magnetic field.

3. A flux gate magnetomer for measuring weak magnetic fields comprising a pair of saturable cores linearly disposed and arranged in physically parallel relationship, a first circuit means on said cores connected to an A.C. voltage source and operable to produce a magnetic flux equal in magnitude and opposite in polarity in the respective cores, a second circuit means including a winding on said cores connected to a phase sensitive rectifier operable to provide a polarity reversible voltage upon the application of a net flux to said cores by a weak magnetic field, a third circuit means on said core connected to a self-balancing magnetic amplifier means, said magnetic amplifier means further connected to said second circuit means whereby a net flux set up in said cores by a weak magnetic field to be measured is completely balanced by an opposing flux created by said third circuit means.

4. A gradiometer for measuring the inhomogeneity of a weak magnetic field comprising a pair of linearly disposed saturable cores arranged in physically parallel relationship, a first circuit means for applying an alternating magnetic flux to said cores, a second circuit means operable to produce a signal voltage upon the application of unequal fluxes to the respective cores, self-balancing magnetic amplifier means connected to said second circuit means to receive a signal voltage therefrom, a third circuit means on said core operable to provide fluxes of equal magnitude and opposite polarities in the respective cores upon energization of said third circuit means, said magnetic amplifier means connected to said third circuit means to energize said third circuit means when unequal fluxes are set up in the respective cores by an inhomogeneous field whereby the flux produced by said third circuit means when subtracted from the flux of the core in the stronger portion of the field to be measured is equal to sum of the flux produced by said third circuit means and the flux of the core in the weaker portion of the field to be measured.

5. An apparatus for compensating for the earth's magnetic field comprising a flux gate magnetometer having a pair of linearly disposed saturable cores arranged in physically parallel relationship, a first circuit means including a winding on each of said cores, said windings interconnected in series opposing relationship to an A.C. voltage source, a second circuit means including a winding on said core connected to a phase-sensitive rectifier said phase-sensitive rectifier operable to produce a polarity-reversible D.C. voltage, a self-balancing magnetic amplifier having a first and a second saturable reactor system, said magnetic amplifier having a gate circuit, a control circuit and an output circuit, said magnetic amplifier operable to produce an output voltage as a result of differential current flow through the gate circuit of the first saturable reactor system with respect to the second saturable reactor system upon the application of a polarity reversible D.C. voltage to said control circuit, a third circuit means including a winding wound around both of said cores and connected to the output of said magnetic amplifier whereby a polarity-reversible D.C. voltage applied to the control circuit of said magnetic amplifier as a result of a flux set up when said cores are placed in the earth's magnetic field causes a current flow in said third circuit means which will create a compensating flux in said cores which is equal in magnitude and opposite in polarity to the flux set up by the earth's magnetic field.

References Cited in the file of this patent
UNITED STATES PATENTS

| | | |
|---|---|---|
| 2,410,039 | Beach | Oct. 29, 1946 |
| 2,468,554 | Hull | Apr. 26, 1949 |
| 2,752,564 | Ryerson | June 26, 1956 |
| 2,832,041 | Trachtenberg | Apr. 22, 1958 |
| 2,916,696 | Schonstedt | Dec. 8, 1959 |
| 2,942,180 | Coker | June 21, 1960 |

UNITED STATES PATENT OFFICE
CERTIFICATE OF CORRECTION

Patent No. 3,040,248            June 19, 1962

William A. Geyger

It is hereby certified that error appears in the above numbered patent requiring correction and that the said Letters Patent should read as corrected below.

In Fig. 1 of the drawings for reference characters $I_F'$ and $I_F''$ read $I_L'$ and $I_L''$.

In Figs. 1 and 2 of the drawings add reference character Ie to designate the conductor to the left hand end of coil C12.

In Fig. 2 of the drawings add reference characters $I_L'$ and $I_L''$ to the bottom arrows."

Signed and sealed this 21st day of May 1963.

SEAL)
Attest:

ERNEST W. SWIDER
Attesting Officer

DAVID L. LADD
Commissioner of Patents